United States Patent
Etter et al.

(10) Patent No.: US 10,238,230 B2
(45) Date of Patent: Mar. 26, 2019

(54) CENTRIFUGAL BREWING MACHINE WITH FLOW COLLECTING ASSEMBLY

(75) Inventors: Stefan Etter, Kehrsatz (CH); Manuela Rothacher Etter, legal representative, Kehrsatz (CH); Alexandre Perentes, Lausanne (CH); Christian Jarisch, Lutry (CH)

(73) Assignee: Nestec S.A., Vevey (CH)

( * ) Notice: Subject to any disclaimer, the term of this patent is extended or adjusted under 35 U.S.C. 154(b) by 343 days.

(21) Appl. No.: 14/237,777

(22) PCT Filed: Aug. 6, 2012

(86) PCT No.: PCT/EP2012/065315
§ 371 (c)(1),
(2), (4) Date: May 16, 2014

(87) PCT Pub. No.: WO2013/020939
PCT Pub. Date: Feb. 14, 2013

(65) Prior Publication Data
US 2014/0326142 A1    Nov. 6, 2014

(30) Foreign Application Priority Data
Aug. 9, 2011 (EP) .................................. 11176926

(51) Int. Cl.
*A47J 31/22* (2006.01)
(52) U.S. Cl.
CPC ..................... *A47J 31/22* (2013.01)
(58) Field of Classification Search
CPC ....................................................... A47J 31/22

USPC .................................... 99/302 C, 287, 302 R
See application file for complete search history.

(56) References Cited

U.S. PATENT DOCUMENTS

| | | | | |
|---|---|---|---|---|
| 4,204,964 A * | 5/1980 | Cailliot | ..................... | B04B 3/08 |
| | | | | 210/370 |
| 4,464,982 A * | 8/1984 | Leuschner | .............. | A47J 31/22 |
| | | | | 99/287 |
| 4,473,002 A * | 9/1984 | Leuschner | .............. | A47J 31/22 |
| | | | | 99/302 C |
| 4,962,693 A * | 10/1990 | Miwa | ..................... | A47J 31/42 |
| | | | | 99/283 |
| 5,265,517 A * | 11/1993 | Gilbert | ..................... | A23F 5/26 |
| | | | | 99/280 |
| 5,359,788 A * | 11/1994 | Gell, Jr. | ................... | A23F 5/04 |
| | | | | 219/502 |
| 5,405,096 A * | 4/1995 | Seol | ..................... | A47J 19/027 |
| | | | | 241/282.1 |
| 6,279,459 B1 * | 8/2001 | Mork | ..................... | A47J 31/22 |
| | | | | 426/433 |
| 6,532,862 B2 * | 3/2003 | Mork | ..................... | A47J 31/22 |
| | | | | 99/279 |

(Continued)

*Primary Examiner* — Ibrahime A Abraham
*Assistant Examiner* — Biniam Asmelash
(74) *Attorney, Agent, or Firm* — K&L Gates LLP

(57) ABSTRACT

Centrifugal brewing machine (1) for preparing a beverage comprising: a rotating brewing unit (2) configured for receiving a liquid and beverage ingredients, a collector (11) disposed around the brewing unit (2) for collecting the brewed liquid projected outwardly as result of the centrifugation forces obtained from the rotation of the brewing unit, wherein a thin annular liquid projection gap (38) is provided between at least one outlet wall (43) of the rotating brewing unit comprising at least one outlet (40) and the collector (11).

10 Claims, 7 Drawing Sheets

(56) References Cited

U.S. PATENT DOCUMENTS

| | | | | |
|---|---|---|---|---|
| 9,265,376 B2* | 2/2016 | Perentes | ................. | A47J 31/22 |
| 2002/0014161 A1* | 2/2002 | Mork | ..................... | A47J 31/22 |
| | | | | 99/279 |
| 2007/0079708 A1* | 4/2007 | Li | ........................... | A47J 31/22 |
| | | | | 99/279 |
| 2010/0173056 A1* | 7/2010 | Yoakim | .................. | A47J 31/22 |
| | | | | 426/433 |
| 2010/0203198 A1* | 8/2010 | Yoakim | .................. | A47J 31/22 |
| | | | | 426/80 |
| 2011/0052761 A1* | 3/2011 | Yoakim | .................. | A47J 31/22 |
| | | | | 426/77 |
| 2011/0217421 A1* | 9/2011 | Perentes | ................. | A47J 31/22 |
| | | | | 426/80 |
| 2011/0244099 A1* | 10/2011 | Perentes | ............. | A47J 31/3695 |
| | | | | 426/431 |
| 2011/0293805 A1* | 12/2011 | Perentes | ................. | A47J 31/22 |
| | | | | 426/433 |
| 2015/0305546 A1* | 10/2015 | Perentes | ................. | A47J 31/22 |
| | | | | 99/302 C |
| 2015/0320254 A1* | 11/2015 | Perentes | ................. | A47J 31/22 |
| | | | | 426/232 |

* cited by examiner

CENTRIFUGAL BREWING MACHINE WITH FLOW COLLECTING ASSEMBLY

CROSS REFERENCE TO RELATED APPLICATIONS

The present application is a National Stage of International Application No. PCT/EP2012/065315, filed on Aug. 6, 2012, which claims priority to European Patent Application No. 11176926.1, filed Aug. 9, 2011, the entire contents of which are being incorporated herein by reference.

FIELD OF THE INVENTION

The present invention relates to the field of beverage machines such as coffee machines, in particular, using the centrifugal forces for brewing beverages. The invention more particularly relates to a beverage machine comprising an improved flow collecting assembly, in particular, enabling to improve the quality of coffee crema.

BACKGROUND OF THE INVENTION

The preparation of a coffee consisting of extracting a liquid by centrifugation from a mixture of solid ingredients and hot water is known. By virtue of the centrifugal forces, the brewed liquid is forced through small interstices such as a peripheral filter, perforated holes, slits and/or a valve. Typically, the brewed liquid is ejected at relatively high centrifugal velocity from the rotating brewing device and is collected in an annular collector surrounding the device.

A problem lies in ensuring the production of beverage foam of superior quality. In particular, the coffee 'crema' obtained from a centrifugal brewing machine is generally of poor in-cup quality. It is generally soapy and/or quickly disappears in cup (not stable).

The present invention provides a solution in which the foam of the beverage, in particular, the coffee crema, can be significantly improved.

For this, the present invention is defined by the main claim. The dependent claims further define the preferred aspects of the invention.

The object of the present invention is achieved by means of the features of the appended claims.

The term "liquid" is essentially used here alone to mean the diluent used for extracting the beverage, generally, water, more preferably hot water.

The term "brewed liquid" is essentially used here to mean a beverage extract, preferentially a coffee extract, obtained by the centrifugal brewing process in the machine of the invention.

SUMMARY OF THE INVENTION

The present invention relates to a centrifugal brewing machine for preparing a beverage comprising:
  a rotating brewing unit configured for receiving a liquid and beverage ingredients,
  a collector disposed around the brewing unit for collecting the brewed liquid projected outwardly as result of the centrifugation forces obtained from the rotation of the brewing unit,
wherein a thin annular liquid projection gap is provided between at least one outlet wall of the rotating brewing unit comprising at least one outlet and the collector.

In particular, the said outlet of the brewing unit preferably comprises a plurality of outlets or a continuous annular slit.

In order to optimize the foamed head of the beverage, in particular, the 'crema' of a coffee beverage, it has been further found that the liquid projection gap defines a flying distance for the brewed liquid between the said outlet wall and the collector. Such distance is preferably comprised between 0.5 and 1.5 mm, more preferably between 0.7 and 1.2 mm, most preferably it is of about 0.8 mm.

The term "flying distance" refers here to the shortest distance at the gap present between said at least one beverage outlet of the said outlet wall and the wall of the collector.

It has also been found that a particular arrangement of the rotating brewing unit, in particular, of the beverage ingredient holder relative to the collector, contributes to the improved production and stability of the coffee 'crema'.

In particular, the annular liquid projection gap further extends between two concentric annular walls; respectively a rotating outlet wall of the brewing unit and an outer wall of the collector.

More preferably, the annular gap extends between an annular outlet wall of the beverage ingredient holder and an annular outer wall of the collector.

In particular, the annular wall of the collector can be an outer uprising wall of an annular collecting track of the collector. The collecting track forms an annular cavity for receiving the brewed liquid. The cavity is preferably open at its upper side. The collecting track may comprise an annular uprising inner wall and an annular uprising outer wall. The track preferably comprises an outlet located in the bottom of the collecting track for evacuating the brewed liquid to a discharge location.

In a mode, the brewing unit may comprise a plurality of outlets distributed through the said annular wall of the beverage ingredient holder. In an alternative, the said outlet of the brewing unit may be a continuous annular slit substantially oriented along a transversal plane perpendicular to the axis of rotation. Such slit can be formed, for example, between the beverage ingredient holder and the liquid feeder or, even in the beverage ingredient holder only.

The beverage ingredient holder may also comprise flow directing means (36, 42) for guiding the flow of centrifuged brewed liquid towards the said plurality of outlets or towards said slit.

The flow directing means (36, 42) may be designed with a portion of wall projecting inside the collector. In other words, at least a portion of the annular wall of the beverage ingredient holder projects in the annular cavity formed by the collecting track so that it can be arranged sufficiently close to the outer wall of the collector onto which the centrifuged brewed liquid can impact. The portion of annular wall projects downwardly, such as from a upper part of the holder, in the, preferably U-shaped, annular cavity of the collector.

In particular, the flow directing means (36, 42) may comprise a series of beverage inlets on the compartment side communicating with the said outlet or plurality of outlets or said slit. The flow directing means (36, 42) may further comprise at least one annular channel or annular chamber providing communication of the beverage inlets with the beverage outlet(s).

The beverage ingredient holder further comprises a connection portion for connecting to a liquid feeder of the brewing unit. The connection portion may comprise a connection means, e.g., an annular groove, for enabling connection with one or more complementary connection means of the liquid feeder.

It was also found that the quality of the coffee 'crema' can be improved and consistently maintained for a longer period of time when the collector is maintained at a temperature above ambient by heating means associated thereto. In a particular mode, the collector is made of a heated block or associated to a heated block. The heater block more preferably comprises at least one heating element extending over an annular path of at least 300 degrees (angle), more preferably at least 320 degrees (angle). The heating element can be a heating cartridge, a heating resistance, a thick film or a combinations thereof.

DETAILED DESCRIPTION OF THE DRAWINGS

Figure 1:
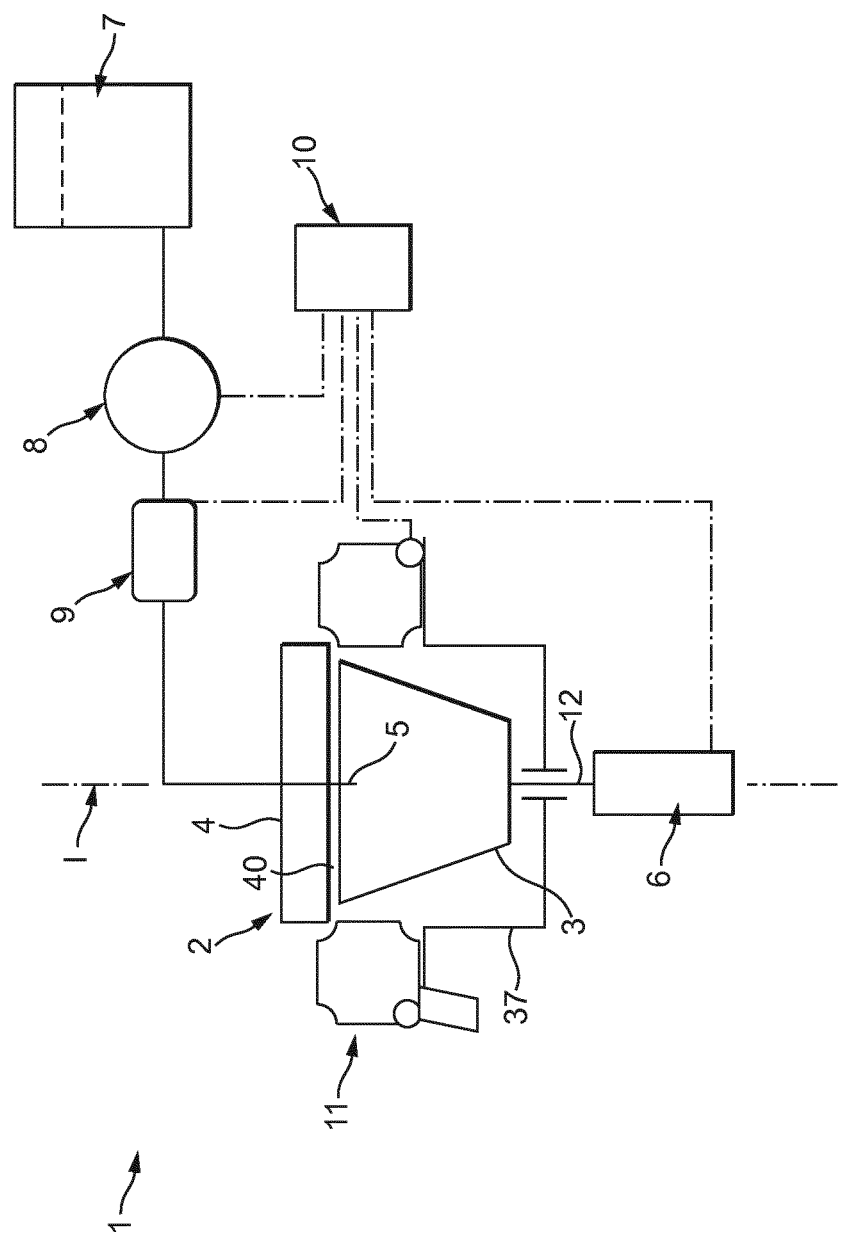
FIG. 1 is a schematic illustration of a beverage machine comprising the collector of the invention.
Figure 2:
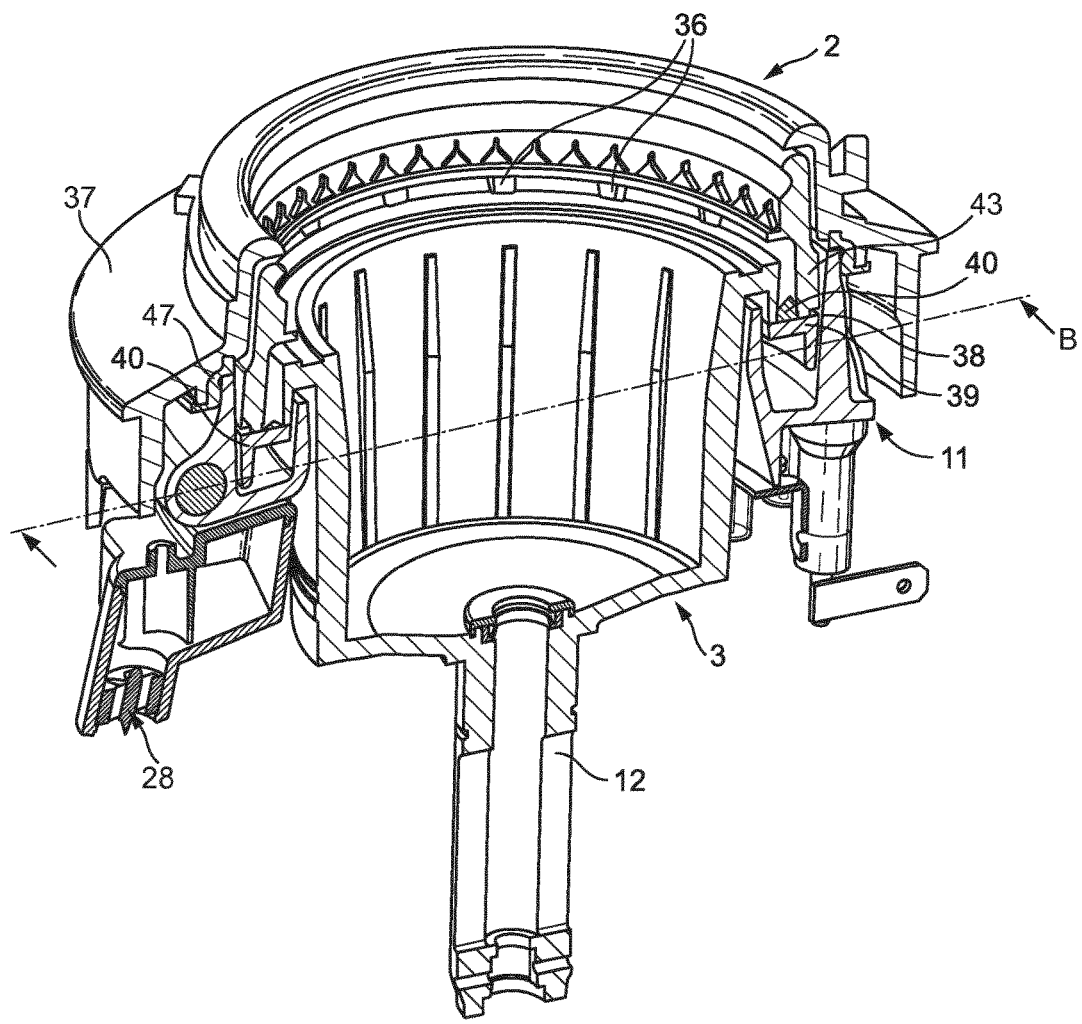
FIG. 2 is a partial perspective cross-sectional view of the machine of FIG. 1.
Figure 3:
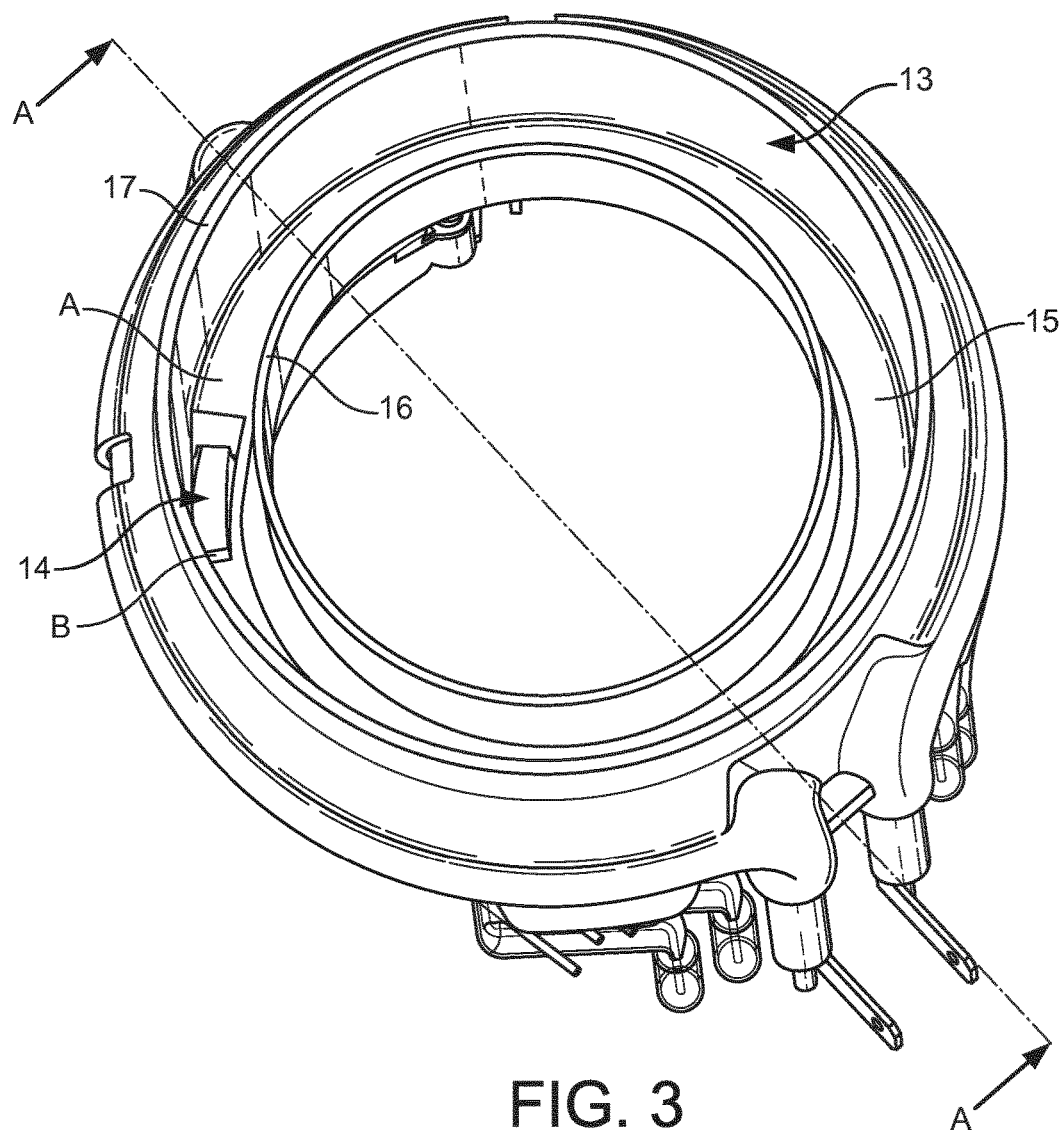
FIG. 3 is a perspective top view of the collector of the invention.
Figure 10:
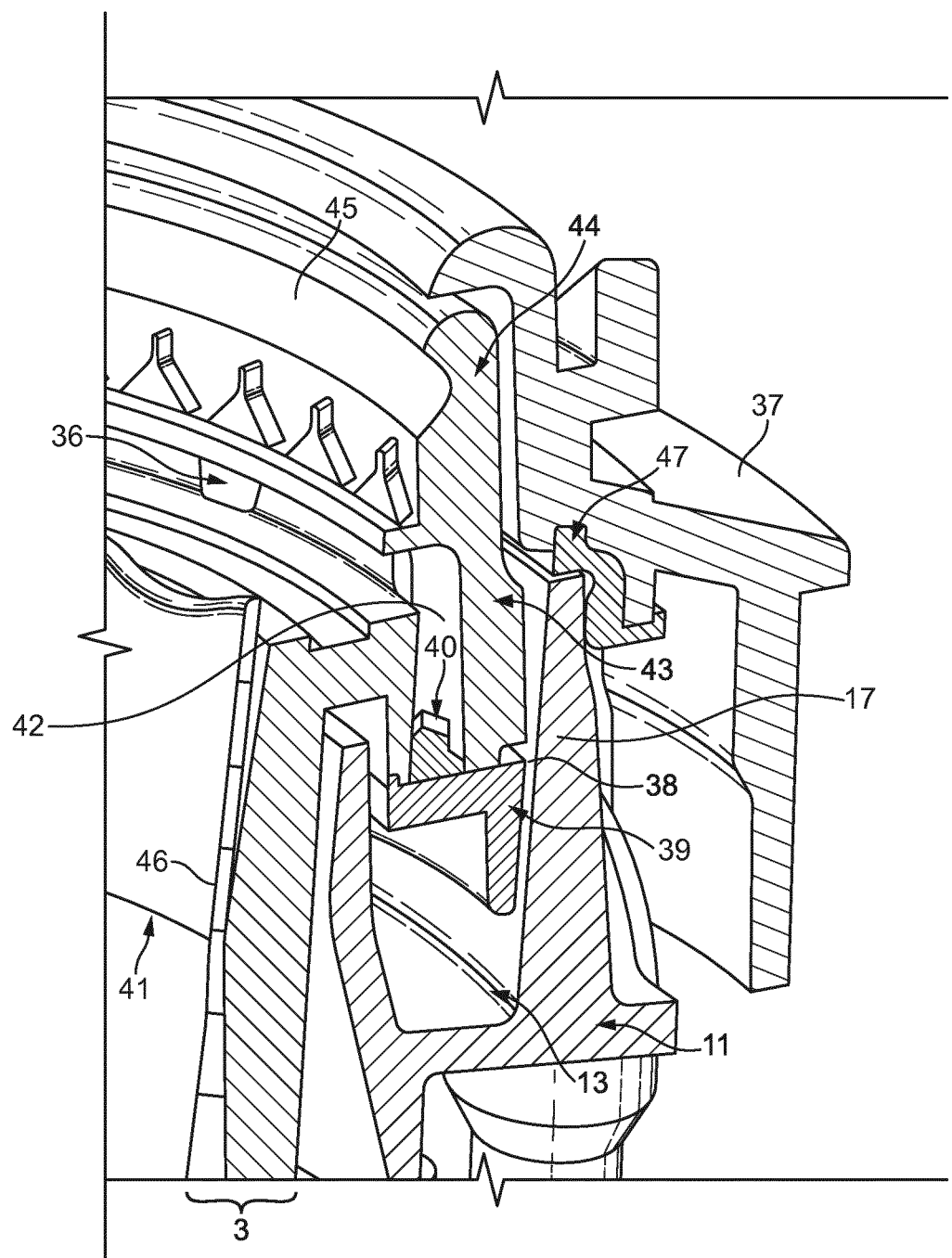
FIG. 10 shows a detailed cross section view of a machine according to a preferred mode of the present invention.

A general illustration of the centrifugal beverage machine 1 of the invention is illustrated in FIG. 1. It generally comprises a brewing unit 2 arranged to rotate at elevated rotational speed along an axis of rotation "I". The rotating brewing unit 2 comprises a beverage ingredient holder 3 and a liquid feeder 4. In brewing operation, the holder and liquid feeder are assembled together via connection means (not shown) so that they are rotated together at the same rotational speed. Flow release means are provided for enabling the flow of brewed liquid to leave the brewing unit, such as, for instance, between the holder and the liquid feeder or in the holder itself. The flow release means can be formed as an annular gap 40 as illustrated in FIG. 1, conduit(s) and/or holes. Other examples of flow release means including holes 36, 40 separated by a channel 42 are visible in FIGS. 2 and 10. For instance, FIGS. 2 and 10 show another configuration with a plurality of peripheral outlets 40 such as throughholes provided in an outer wall 43 of the beverage ingredient holder 3. These outlets 40 are arranged for allowing communication of the centrifuged brewed liquid from the inner side of the holder (compartment 41) to the outer side of the holder in the upper region of the holder. These flow release means will be detailed later in the description but they are not necessarily limiting the scope of the invention.

The rotation of the brewing unit is obtained by the assembling of the holder 3 and liquid feeder 4 in rotational engagement in the frame of the machine and by driving the holder or liquid feeder via a rotary motor 6. In the present example, the holder comprises a rotational axle 12, mounted via bearings to a lower frame 37, which is linked to the motor 6 for enabling the holder to be driven in rotation and thereby to drive the feeder 4 indirectly.

The holder 3 may comprise a cup-shaped compartment for receiving beverage ingredients or a portioned package such as a capsule containing beverage ingredients (e.g., ground coffee). Depending on the machine, in particular, depending on the design of the brewing unit, beverage ingredients such as ground coffee can be directly loaded into the holder or, alternatively, be contained in a single or refillable capsule which is loaded into the holder (not shown).

The liquid feeder 4 is arranged to supply liquid in the brewing unit for mixing with the beverage ingredients contained in the holder. For this, a liquid injector 5 is provided along the rotational axis of the feeder. The liquid injector may be a tube, a lance or needle which is arranged to inject liquid in the compartment. Liquid is supplied to the liquid feeder from a liquid reservoir 7 of the machine or, alternatively, from an external source of liquid, such as a potable water supply. A suitable pump 8, such as an electric pump, is in fluid communication with the liquid conduit between the reservoir and the liquid feeder and operable to deliver liquid from the reservoir 7 to the injector 5. The pump may be a centrifugal or piston pump or any other type of suitable pump. The pump is electrically connected to a control unit 10 that operates the pump to control the flow rate and quantity of liquid delivered to the brewing unit. It is understood that the machine may not include a pump. For example, the machine may be configured to deliver water to the brewing unit by gravity. In one such example, the liquid reservoir 7 may be positioned above the liquid injector 5 and the liquid supply line may comprise at least one control valve (not shown) for opening and closing the injector or reservoir.

The machine preferably comprises a heater 9 for heating liquid before it is dispensed through the injector 5 of the liquid feeder 4. For example, the heater can be an instant heater or a thermo-block. Liquid entering the heater may be heated to a temperature which corresponds to the optimal brewing temperature of the beverage to be prepared. For this, at least one liquid temperature sensor is usually provided at and/or downstream of the heater to ensure that the temperature of the liquid exiting the heater or entering the brewing unit does not exceed a defined threshold or profile of temperature. The control of the temperature by the heater and sensor(s) is further processed by the control unit 10 which receives the temperature input from the sensor and switches the heater on and off in a manner to control the defined threshold or profile of temperature.

It should be noticed that the control unit 10 (e.g., a microcontroller) is adapted to control various functions of the beverage machine, in particular, the rotational speed of the brewing unit which also determines important brewing characteristics such as the beverage flow rate. The machine may also include a user interface (not shown) to allow the user to select, for example, a desired volume of beverage and/or to interrupt the brewing cycle at a desired time. The user interface may also allow for the user to make other selections, including, but not limited to, a temperature of the end product beverage, or trigger the discharge of other components such as milk in the beverage from a different module of the machine (not shown). Of course, certain selections can be automatically run such by identification of a code on a capsule containing the beverage ingredients.

According to an aspect of the invention, the beverage machine comprises a beverage collector 11 for collecting the brewed liquid being centrifuged from the brewing unit 2. For this, the collector comprises an annular collecting track 13.

The collector preferably extends in an annular fashion at the periphery of the brewing unit.

FIGS. 3 to 7 show a preferred, but non-limiting, embodiment of the beverage collector of the invention.

Figure 5:
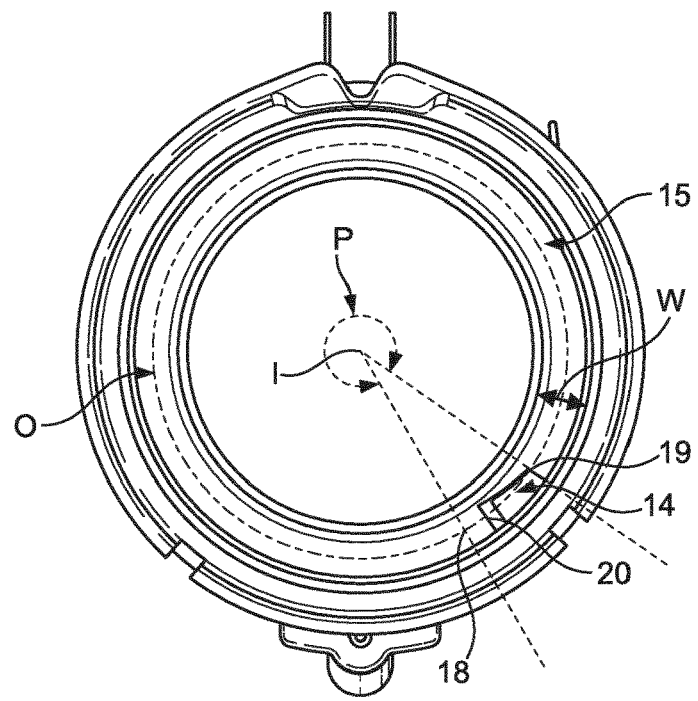
FIG. 5 is a top plane view of the collector of FIGS. 3 and 4.

The annular collecting track 13 comprises a ramp surface 15 extending in the annular direction "O" as shown in FIG. 5. The collector further comprises at least one outlet 14 which is present in the collecting track. The outlet 14 extends both in the radial and annular directions. In the circumferential or annular direction, the outlet comprises a highest end and a lowest end opposite the highest end.

The collecting track preferably has a bottom wall onto which the ramp surface is defined. The ramp surface lowers in the annular direction "O" towards the outlet. More preferably, the ramp surface is an helix-shaped surface. The track may be further demarcated by an annular upright inner wall 16 and an annular upright outer wall 17. These two walls and the bottom wall define together the collecting track which may thus take a substantially U-shaped form in the transversal cross-section of the collector. The ramp surface lowers in that, considering the outlet 14 as the reference, the ramp surface presents a higher point 18 and a lower point 19; such points 18, 19 being annularly distant one another in the collecting track. Preferably, the ramp surface extends along an angular path "P" which is at least of 250 degrees (angle), more preferably at least 300 degrees (angle) of the track. For example, for a ramp surface of about 350 degrees (angle), the axial height between the higher point 18 and the lower point 19 is comprised between 3 and 20 mm. It should be noticed that the ramp surface 15 is not necessarily flat in transversal cross-section but could as well be concave. Even, the ramp surface could be limited to a point in transverse cross-section of the collector or an helix-shaped line following the direction "O" so that the inner and outer walls merge in a lowest point in order to confer a V-shaped form to the collecting track.

Preferably, the ramp surface merges with the lowest circumferential end of the outlet. In other words, lower point 19 of the ramp surface coincides with said lowest end of the outlet 14 or at least stands slightly above it. As a result, liquid can drain from the ramp surface directly to the outlet without forming a sitting zone for residual liquid before the outlet.

Similarly, the ramp surface preferably ends close to or at the outlet. In the illustrated example, the higher point 18 of the ramp surface ends close to the upper or highest circumferential end of the outlet. In such arrangement, a second ramp surface 20 of reverse slope and smaller angular length is provided between the main ramp surface 15 and the upper end of the outlet 14. As a result, liquid is also guided down to the outlet in this transitional area of the track.

As illustrated, the ramp surface forms a continuously lowering surface towards the outlet. It could be possible to have a discontinuous lowering, such as a stepwise evolution of the lowering, although such arrangement would be less preferred.

The configuration of the outlet 14 may greatly vary. However, for all modes of the invention, the outlet preferably extends circumferentially in an inclined fashion relative to the annular plane of the collector (i.e., the plane normal to axis I). The inclination is oriented inversely to the inclination of the ramp such that outlet forms a sort of "mouth" for receiving liquid circulating in its direction in the track. Preferably, the outlet extends across at least 0.5 time, most preferably at least 0.75 time the largest width "W" of the collecting track. Preferably, the outlet is substantially equal to the largest width. The cross-section of the outlet may depend on various factor, in particular, it is sufficiently wide to allow a rapid evacuation of the liquid collected from the centrifugal brewing unit. In general, the outlet comprises an overall opening surface area comprised between 20 and 300 mm$^2$. A preferred design is an outlet having a longer circumferential length and a shorter radial width. The shape of the outlet may also vary. It may be rectangular, square, triangular, trapezoidal, circular, ovoid, oblong, etc. The outlet may also be formed of several openings such as to form a grid or a screen for the beverage.

The number of outlets may also vary in the collecting track. For example, two or more outlets can be provided, at an annular distance separated one another, in the collecting track and be separated by ramp surfaces. For instance, two outlets may be distributed at about 180 degrees (angle) in the collecting track and be separated on each end by a ramp surface. The number of outlets can be of two, three or more. In order to obtain a proper drainage of the centrifuged liquid in the collecting track, at least one ramp surface is provided in the annular area between the outlets.

Figure 6:
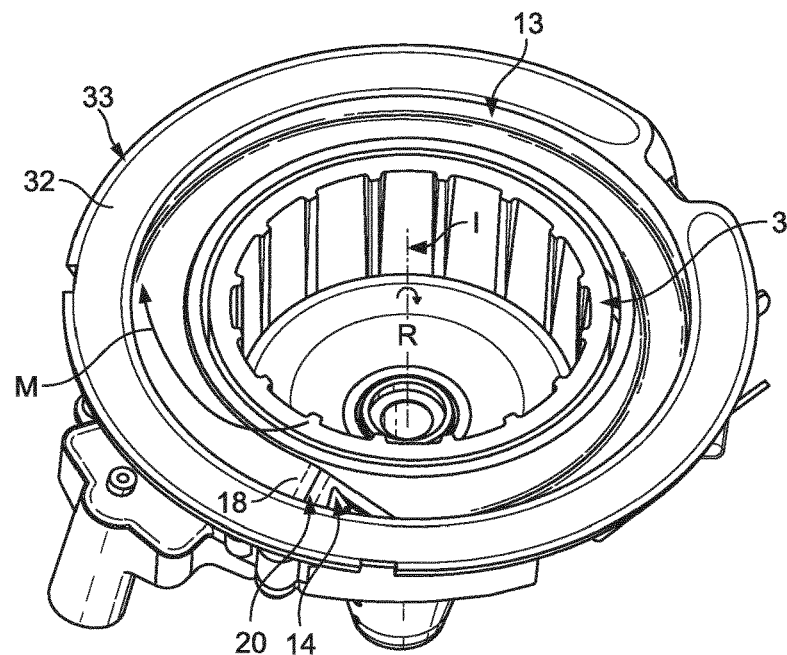
FIG. 6 is a partial perspective cross sectional view along B-B of the machine of FIG. 2.

In a preferred arrangement of the collector in the machine illustrated in FIG. 6, the rotating brewing unit is arranged to be rotated in rotational direction R, e.g., in clockwise direction, and the collector is disposed about the rotating brewing unit (only a partial view of the holder 3 is shown for sake of clarity). The ramp surface of the collecting track is arranged to lower in the rotational direction R of the rotating brewing unit. Therefore, the surface progressively lowers towards the momentum direction "M" of the liquid flow as illustrated in FIG. 6.

Figure 4:
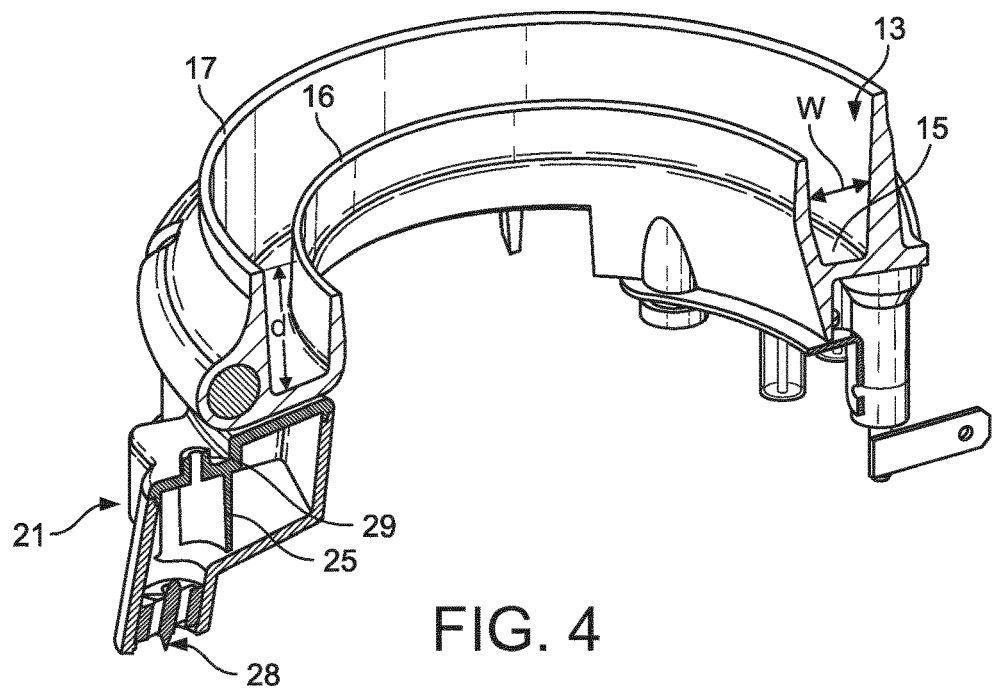
FIG. 4 is a cross-sectional perspective view along A-A of the collector of FIG. 3.

In a preferred arrangement, the collecting track 13 is further arranged with an upright outer wall 17 defining a depth "d" of the track which increases as the ramp surface lowers (FIG. 4).

Figure 8:
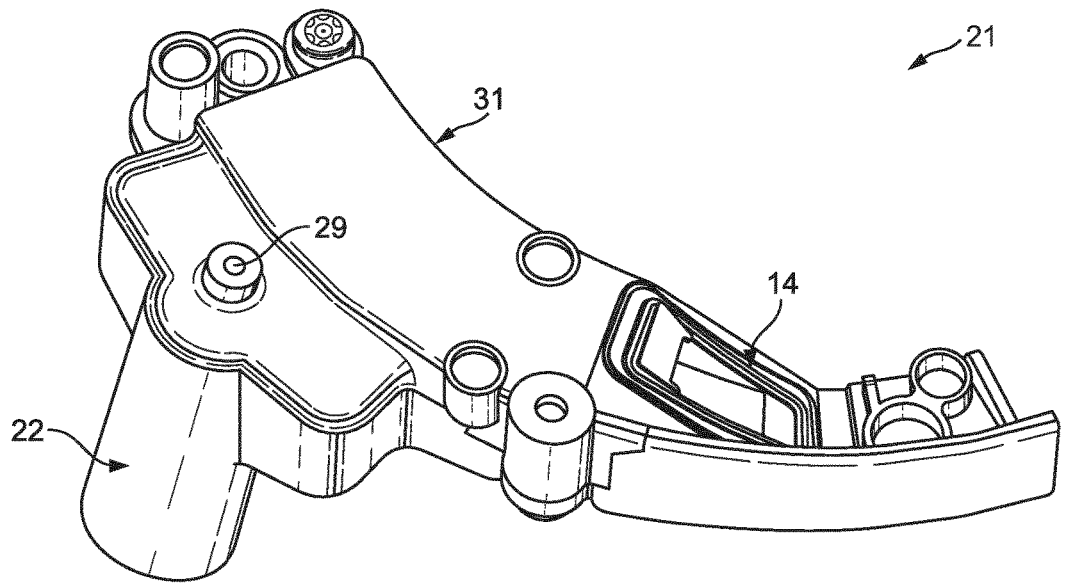
FIG. 8 is a perspective view of the beverage discharge assembly of the collector.
Figure 9:
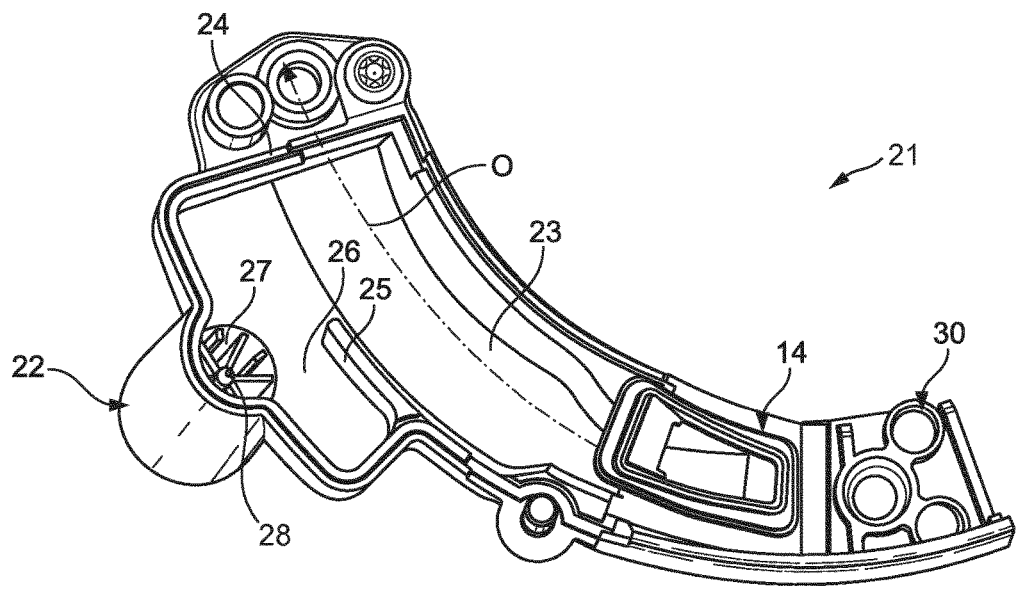
FIG. 9 is a partial internal view of the discharge assembly of FIG. 8 without its cover.

FIGS. 8 and 9 illustrate a preferred embodiment of the beverage discharge assembly 21 of the collector of the invention. Such assembly is associated to the collecting track to guide the beverage passed the outlet 14 to a discharge duct 22. The outlet 14 thereby extends by a discharge conduit 23 located below the collecting track and oriented in the annular direction "O" or concentrically to the direction "O" or tangentially to such direction or even diverging in curve to said direction. The discharge conduit can be curved or rectilinear. Preferably, a flow obstructing means is provided in the discharge assembly which is arranged to slow the liquid flow down once it passed the outlet. In particular, a transversal. e.g. radial, wall 24 extends across the direction of extension of the conduit 23 downstream the outlet. Therefore, the flow of liquid passing through the outlet with high momentum is suddenly stopped by the transversal wall 24. Moreover, a chicane 25 can be designed in the discharge assembly to further re-orient the flow. The chicane 25 may be designed to partially separate the conduit 23 with a second conduit or chamber 26 which is capable to contain enough liquid to prevent backflow of brewed liquid in the collecting track.

Further downstream of the conduit 23, a discharge duct 22 is provided which is preferably, although not necessarily, oriented transversally to the annular direction "O". The duct 22 may comprise a conduit 27. Such conduit may also be provided with means for smoothening the flow of liquid or "flow breaker" such as a grid or flow separating structure 28. The beverage discharge assembly may also further comprise an air hole or conduit 29 on top of the discharge duct to equilibrate pressure in the discharge duct.

Figure 7:
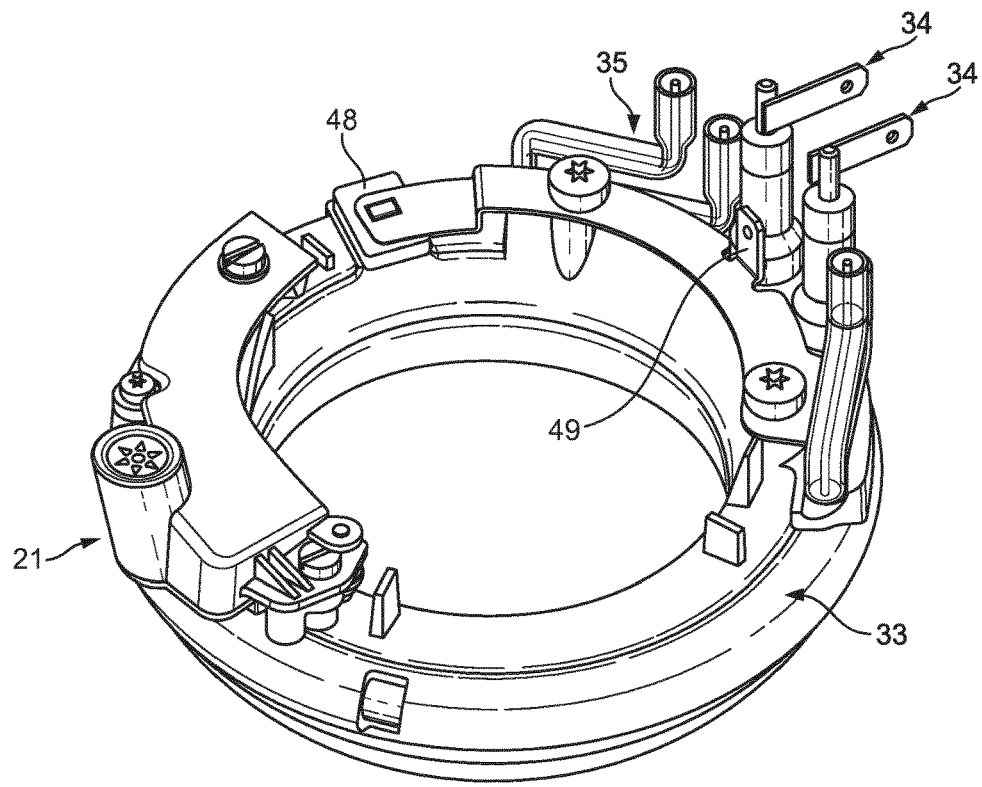
FIG. 7 is a bottom perspective view of the collector of FIGS. 3, 4 and 5.

It should be noticed that the beverage discharge assembly 21 may be formed of moulded plastic and/or metal parts such as a housing 30 and a cover 31 assembled onto the housing. The housing may comprise the main wall structure, i.e., the wall 24, chicane 25 and duct 22 The assembly of these two parts can be obtained by riveting, screwing and/or welding. The assembly may be easily connected to the collecting track 13 by screwing, riveting and/or welding as shown in FIG. 7. Of course, other assembling structures can be envisaged which differ from the present one without departing from the scope of the present invention.

In another aspect of the collector of the invention which is illustrated in FIGS. 4, 6 and 7, the annular collecting track 13 is heated. For this, the track is made of or otherwise thermally associated to a heated block 33. Preferably, the heated block embeds at least one heating element 32. The heating means, such as one or more elements, preferably extends over an annular portion of the track. More preferably, it extends along an annular path of at least 300 degrees (angle), more preferably at least 320 degrees (angle), most preferably at least 340 degrees (angle). The heating element is connected to electrical wires 35, electrical connectors 34 and earth connector 49 shown only in partial representation.

The heating element may be positioned in the block to surround the collecting track for reasons of good integration of the collector in the machine, in particular, in view of the inside positioning of the brewing unit. For this, the heating element 32 has a wider diameter than the diameter of extension of the collecting track 13 (FIG. 6). However, other arrangements could be envisaged such as one or more heating elements of same or smaller diameter placed below or above the track.

The heated block may be made of metal material having high heat conductivity such as copper, brass, aluminium, steel and the like. A heat element may be a heating resistance, a heating cartridge or a thick film. When the heated block also forms the collecting track, it may be necessary to have a food-grade protective coating such as a fluoropolymer coating (e.g., TEFLON, ILAFLON). The coating may be chosen to have high abrasion resistance and non-stick properties to food. For safety reasons, the collector and its electrical means may be further thermally and electrically insulated from the rest of the machine by plastic pieces and/or sheath, e.g., Teflon.

The temperature control of the heated block of the collector can be carried out by at least one temperature sensor 48, e.g., NTC element(s), placed in contact with or embedded in the heated block. The regulation temperature range of the collector may be comprised between 60 and 100° C. The temperature may vary depending on the beverage type, the quantity of discharge beverage and/or the flow rate. The temperature or a profile of temperatures may also be controlled in such a manner that the temperature of the heated block decreases as the flow rate is lower and/or the quantity of beverage (e.g., coffee) becomes smaller. The heated block may further comprise one or more electrical fuses which cut the current to the heating element(s) for preventing overheating of the collector.

Considering the more detailed view in FIG. 10, the brewing unit is arranged with the collector in the machine such that the upright outer wall 17 of the collector also forms with the rotating brewing unit, a liquid projection gap 38.

More particularly, the beverage ingredient holder extends by an outlet wall 43 which projects in the collector, in particular, in the collecting track. The outlet wall 43 comprises a plurality of outlets 40 enabling the brewed liquid to leave the brewing unit during the centrifugation process. The outlets 40 are in communication with inlets 36 of the wall via channels or an annular chamber 42. The inlets 36 are in communication with the compartment of the holder. For example, they are in communication with outlets provided in a (coffee) capsule received in the compartment (not shown). The liquid projection gap 38 represents the radial distance or width measured at the outlets 40, between the outlet wall 43 of the beverage ingredient holder 3 and the inner surface of the outer wall 17. Such liquid projection gap further extends down to finally open to the collecting track 13 for enabling the collecting track to collect the liquid being projected onto the outer wall 17 from the inlets 36 of the brewing unit by effect of the centrifugal forces during brewing of the beverage. Importantly, this radial width of the liquid projection gap 38, also representing the "flying distance" of the liquid being projected from the holder onto the outer wall 17 of the collector, is controlled to provide an optimal formation of the beverage foam, in particular, for coffee, a thick and persistent "crema" including fine bubbles. It is supposed that the texture and thickness of the foam is created in this liquid projection gap 38. For this, the preferred radial width ("flying distance" for the brewed liquid) of the liquid projection gap 38 is measured at the edge of the outlets 40 which is positioned the closest to the outer wall 17. Such flying distance or width is comprised between 0.5 and 1.5 mm, more preferably between 0.7 and 1.0 mm, most preferably at about 0.8 mm. It should also be noticed that the outlets 40 can be replaced by a continuous slit provided in the holder without departing from the scope of the present invention.

It should be noted that the particular structure of the beverage ingredient holder shown in FIG. 10 represents a preferred mode but does not limit the scope of the present invention. The holder is designed for providing a better integration to the collector while controlling the flow of liquid through the liquid projection gap 38 as discussed. It is also designed to facilitate its connection to the liquid injection feeder such as it is described in co-pending PCT/EP11/061083 entitled: "Device for preparing a beverage by centrifugation".

For example, the holder 3 can be designed to receive a beverage capsule (not shown) in its compartment 41. The compartment may be equipped with a capsule ejection mechanism 46 such as also described in co-pending European patent application No. 11167862.9 entitled: "Device and method for retrieving a capsule from a beverage production apparatus". When the brewing unit is rotated at elevated speed, brewed liquid is forced through peripherally distributed inlets 36 of the holder. The brewed liquid is thus projected in channel(s), or a chamber 42, which re-distribute the liquid through the outlets 40. A lower closure wall portion 39 of the wall 43 also closes the bottom of the outlets 40 and forces the flow radially towards the outer wall of the collector. The brewed liquid is thus allowed to enter the liquid projection gap 38 down to the collecting track 13.

An upper seal 47 may also be provided between the outer wall and the frame 37 to ensure that liquid cannot flow over the collector. The brewed liquid then travels to the discharge assembly of the collector as already discussed and is collected in a receptacle such as a cup or mug. In other possible beverage machines, the design of the beverage ingredient holder can be simplified. For instance, in a different design (not shown), a simple array of outlets in another wall of the holder can be envisaged to allow the communication between the compartment and the liquid projection gap 38.

The beverage ingredient holder 3 may further comprise a portion of wall 44 extending upwardly opposite the outlet wall 43 for enabling the connection of the holder to the liquid feeder of the brewing unit. In other words, this portion of wall enables the closing of the brewing unit for the centrifugation process. This portion of wall 44 may comprise connection means such as an annular groove 45. The groove 45 may be oriented inwardly and be shaped to receive one or more complementary connection means of the liquid feeder such as spring-biased pins (not shown) as described in co-pending international patent application PCT/EP11/061083.

Additionally, the connection portion may comprise mechanical gear means 50 extending annularly which are configured to fit to complementary gear means (not shown) of the liquid feeder. These gear means increases the torque resistance of the connection between the beverage ingredient holder and the liquid feeder. As a result, the gear of the liquid feeder by the holder driven by the motor is improved. The mechanical constraints on the inserted (beverage ingredient containing) capsule are also reduced so that it reduces the risk of damaging the packaging material of the capsule.

It should be noted that the invention can be applied to centrifugal beverage machines using portioned packages such as capsules or other types such as coffee machine which use ground coffee from a canister or a grinding device.

NUMERICAL REFERENCES TO FIGURES

1: Centrifugal beverage machine
2: Rotating brewing unit
3: Beverage ingredient holder
4: Liquid injection feeder
5: Liquid inlet
6: Driving motor
7: Liquid reservoir
8: Liquid pump
9: Liquid heater
10: Control unit
11: Collector
12: Rotational axle
13: Annular collecting track
14: Outlet of collecting track
15: Ramp surface
16: Inner wall
17: Outer wall
18: Higher point
19: Lower point
20: Second ramp surface
21: Beverage discharge assembly
22: Discharge duct
23: First conduit
24: Transversal wall
25: Chicane
26: Second conduit
27: Conduit of discharge duct
28: Flow breaker
29: Air hole
30: Housing
31: Cover
32: Heating element
33: Heated block
34: Electrical connectors
35: Electrical wires
36: Inlets or holes
37: Lower frame
38: Liquid projection gap
39: Holder closure wall portion
40: Holes or outlets
41: Compartment of the holder
42: Channel or chamber
43: Outlet wall of holder
44: Portion of wall for connection
45: Annular groove
46: Capsule ejection mechanism
47: Seal
48: Temperature sensor
49: Earth connector
50: Mechanical gear means

The invention claimed is:

1. A centrifugal brewing machine for preparing a beverage, the centrifugal brewing machine comprising:
a rotating brewing unit comprising a beverage ingredient holder, configured for receiving liquid and beverage ingredients, and mechanically coupled to a motor unit in the centrifugal brewing machine, the beverage ingredient holder comprises at least one outlet wall, and the motor unit is linked to the beverage ingredient holder and configured to rotate the beverage ingredient holder;
a collector that encircles the rotating brewing unit for collecting brewed liquid projected outwardly as a result of centrifugation forces due to rotation of the rotating brewing unit, the collector comprising an annular collecting track that comprises an annular wall heated by a heater physically connected thereto; and
a thin annular liquid projection gap extending between the at least one outlet wall of the beverage ingredient holder and the annular wall of the annular collecting track of the collector, the at least one outlet wall comprising a plurality of outlets or a continuous annular slit for enabling the brewed liquid to leave the rotating brewing unit during centrifugation process,
the beverage ingredient holder comprising a flow directing member configured to guide a flow of the brewed liquid towards the plurality of outlets or the continuous annular slit, and the flow directing member comprising at least a portion of the annular wall projecting downwards inside the collector.

2. The centrifugal brewing machine according to claim 1, wherein the thin annular liquid projection gap defines a flying distance for the brewed liquid between the at least one outlet wall and the collector of between 0.5 and 1.5 mm.

3. The centrifugal brewing machine according to claim 1, wherein the annular wall is an outer upright wall of the annular collecting track of the collector.

4. The centrifugal brewing machine according to claim 1, wherein the flow directing member comprises a series of beverage inlets communicating with the plurality of outlets or the continuous annular slit.

5. The centrifugal brewing machine according to claim 4, wherein the flow directing member further comprises at least one annular channel or chamber allowing communication of the series of beverage inlets with the plurality of outlets.

6. The centrifugal brewing machine according to claim 4, wherein the beverage ingredient holder further comprises a connection portion for connecting to a liquid feeder of the rotating brewing unit.

7. The centrifugal brewing machine according to claim 1, wherein the collector embeds a heated block.

8. The centrifugal brewing machine according to claim 1, wherein the heater comprises at least one heating element extending along the collector in an annular path of at least 300 degrees.

9. The centrifugal brewing machine according to claim 8, wherein the at least one heating element is selected from the group consisting of a heating cartridge, a heating resistance, a thick film, and combinations thereof.

10. The centrifugal brewing machine according to claim 1, wherein the annular collecting track comprises a ramp surface extending in the annular direction toward the outlet, and the collecting track has a bottom wall onto which the ramp surface is defined.

* * * * *